(12) United States Patent
Lauritsen et al.

(10) Patent No.: US 9,745,955 B2
(45) Date of Patent: Aug. 29, 2017

(54) WIND TURBINE BLADE

(71) Applicant: VESTAS WIND SYSTEMS A/S, Aarhus N (DK)

(72) Inventors: Steen M. Lauritsen, Egå (DK); Jonas Romblad, Risskov (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 537 days.

(21) Appl. No.: 14/366,609

(22) PCT Filed: Dec. 19, 2012

(86) PCT No.: PCT/DK2012/050476
§ 371 (c)(1),
(2) Date: Jun. 18, 2014

(87) PCT Pub. No.: WO2013/091647
PCT Pub. Date: Jun. 27, 2013

(65) Prior Publication Data
US 2015/0125309 A1 May 7, 2015

Related U.S. Application Data

(60) Provisional application No. 61/579,657, filed on Dec. 23, 2011.

(30) Foreign Application Priority Data

Dec. 21, 2011 (DK) ............................... 2011 70737

(51) Int. Cl.
*F01D 5/08* (2006.01)
*F03D 1/06* (2006.01)
*F03D 80/40* (2016.01)

(52) U.S. Cl.
CPC ........... *F03D 1/0675* (2013.01); *F03D 80/40* (2016.05); *F05B 2260/20* (2013.01); *F05B 2260/64* (2013.01); *Y02E 10/721* (2013.01)

(58) Field of Classification Search
CPC ........ F03D 80/40; F03D 80/30; F03D 1/0675; F01D 5/08; F05B 2260/20
(Continued)

(56) References Cited

U.S. PATENT DOCUMENTS 2,556,736 A * 6/1951 Palmatier ............... B64D 15/02
                                                            239/76
7,244,102 B2 * 7/2007 Delucis ................. F03D 1/0658
                                                            415/908

(Continued)

FOREIGN PATENT DOCUMENTS

CN     200995458       12/2007
CN     201363233 Y     12/2009
(Continued)

OTHER PUBLICATIONS

International Search Report for PCT/DK2012/050476, Apr. 3, 2013.
Danish Search Report for PA 2011 70737, Jul. 30, 2012.

*Primary Examiner* — Gregory Anderson
*Assistant Examiner* — Jason Fountain
(74) *Attorney, Agent, or Firm* — Patterson + Sheridan, LLP

(57) ABSTRACT

A wind turbine blade having an elongated blade body extending along a longitudinal axis and having an upper skin and a lower skin, the lower skin spaced from the upper skin in a thickness direction of the blade body, the upper skin and/or lower skin having a laminated layer, the laminated layer having an outer layer wherein the outer layer forms part of the upper and/or lower skin respectively, an inner layer spaced from the outer layer in the thickness direction; and an intermediate layer sandwiched between the outer
(Continued)

layer and inner layer, the intermediate layer having a plurality of heat transfer paths within the intermediate layer for transferring heat.

20 Claims, 4 Drawing Sheets

(58) Field of Classification Search
 USPC ....... 416/97 A, 96 R, 229 R, 230; 244/134 R
 See application file for complete search history.

(56) References Cited

U.S. PATENT DOCUMENTS

| | | | |
|---|---|---|---|
| 9,421,742 B2* | 8/2016 | Grove-Nielsen | B32B 27/00 |
| 2005/0242233 A1 | 11/2005 | Battisti | |
| 2008/0099617 A1* | 5/2008 | Gilmore | B64D 15/14 |
| | | | 244/134 R |
| 2013/0028738 A1* | 1/2013 | Nordin | H05B 3/145 |
| | | | 416/39 |

FOREIGN PATENT DOCUMENTS

| | | |
|---|---|---|
| CN | 201367977 | 12/2009 |
| WO | 2011/029274 A1 | 3/2011 |
| WO | 2011/096851 A1 | 8/2011 |

* cited by examiner

WIND TURBINE BLADE

FIELD OF INVENTION

The present invention relates to a wind turbine blade, such as, a self-deicing wind turbine blade of a wind turbine.

BACKGROUND

During the operation of a wind turbine in cold weather, it is very likely that ice may be formed on the surface of wind turbine blades due to freezing of water on the cold surface. The accumulation of ice on the surface can result in undesirable consequences. For example, a change in the profile of the wind turbine blades due to the accumulation of ice reduces the lift-drag ratio of the airfoil which can result in a decrease in the speed of rotation of the wind turbine. When this happens, the wind turbine is unable to obtain optimal speed and efficiency of the wind turbine is reduced. In addition, the weight of the ice accumulated on the wind turbine blades would add weight to the blades and cause stress on the blades. This may result in stress failure in the blades.

There have been many attempts made to remove the ice that has accumulated on the surfaces. One of the attempts is the application of a coating that is capable of preventing adhesion of ice on the blade, e.g. Teflon® coating onto an underlying painted surface of the blade so that ice can slip off the coating and is prevented from accumulating on the surface. However, the application of the coatings can be costly and repeat applications of the coatings to replace worn out coatings would increase cost and downtime of the machines. In another attempt, deicing fluid has been used to dislodge the ice from the surface. However, the application of deicing fluid requires the blades to be stationery and not only does it require a downtime of the turbine, it is seemingly not effective in preventing the accumulation of ice on the blades. Yet another attempt of deicing wind turbine blade is the installation of heating panels on the blade to melt the ice. However, this method affects the aerodynamics of the blade and hence the efficiency of the blade and is expensive and difficult to maintain.

The present invention aims to provide a wind turbine blade capable of deicing ice accumulated on it without the disadvantages discussed above.

SUMMARY OF THE INVENTION

The present invention provides a wind turbine blade having an elongated blade body extending along a longitudinal axis and having a blade root at one longitudinal end of the blade body and a blade tip at another longitudinal end of the blade body; a leading edge and a trailing edge, both extending from the blade root to the blade tip, the trailing edge spaced from the leading edge in a span-wise direction of the blade body; an upper skin and a lower skin extending from the leading edge to the trailing edge and from the blade root to the blade tip, the lower skin spaced from the upper skin in a thickness direction of the blade body, the upper skin and the lower skin defining a space therebetween, the upper skin and/or lower skin comprises a laminated layer extending from the blade root towards the blade tip and at least adjacent from or from the leading edge towards the trailing edge, the laminated layer having an outer layer wherein the outer layer forms part of the upper and/or lower skin respectively; an inner layer spaced from the outer layer in the thickness direction; and an intermediate layer sandwiched between the outer layer and inner layer, the intermediate layer having a plurality of heat transfer paths extending from the blade root towards the blade tip within the intermediate layer for transferring heat from the blade root towards the blade tip.

According to an aspect of the present invention, there are more than two, three or four of the heat transfer paths in the intermediate layer.

According to another aspect, the laminated layer extends from the blade root to the blade tip and wherein optionally, the plurality of heat transfer paths extend from the blade root to the blade tip.

According to another aspect, the plurality of heat transfer paths are adjacent the outer layer along a substantial length of the blade body so that heat can be transferred to the outer layer effectively and efficiently.

According to another aspect, one or more or each of the heat transfer paths has a cross-sectional area which is transverse to the longitudinal axis and extends from the inner layer to the outer layer.

According to another aspect, a portion of the plurality of heat transfer paths are interlinked to form a network of heat transfer paths to allow transferring of heat from one path to another when heat is transferred from the blade root towards the blade tip.

According to another aspect, the intermediate layer comprises or is formed by a foam layer wherein the heat transfer paths are formed in the foam layer.

According to another aspect, the concentration of heat transfer paths or the number of heat transfer paths per unit area running adjacent the leading edge is higher than the concentration of heat transfer paths or the number of heat transfer paths per unit area along the blade body away from the leading edge.

According to another aspect, one or more or each of heat transfer paths are formed by channels adapted to guide a fluid therealong whereby the heat can be transferred via the fluid.

According to another aspect, the intermediate layer is formed as a corrugated layer with outer and inner channels being configured into the corrugated layer wherein the outer channels face the outer layer and the inner channels face the inner layer.

According to another aspect, the wind turbine blade has a return fluid duct within the intermediate layer and in fluid communication with the channels for directing the fluid back towards the blade root so that the fluid can be re-circulated into the channels.

According to another aspect, the fluid is air.

According to another aspect, the wind turbine blade has an air vent in the inner layer of the laminate layer, the air vent being in fluid communication with the channels for releasing the air into the space within the blade body.

According to another aspect, the wind turbine blade has an exhaust air vent on the outer layer of the laminate layer, the exhaust air vent being in fluid communication with the channels for releasing the air into the environment.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

The following detailed description refers to the accompanying drawings that show, by way of illustration, specific details and embodiments in which the invention may be practiced. These embodiments are described in sufficient detail to enable those skilled in the art to practice the invention. Other embodiments may be utilized and structural, logical, and electrical changes may be made without departing from the scope of the invention. The various embodiments are not necessarily mutually exclusive, as some embodiments can be combined with one or more other embodiments to form new embodiments.

Figure 1:
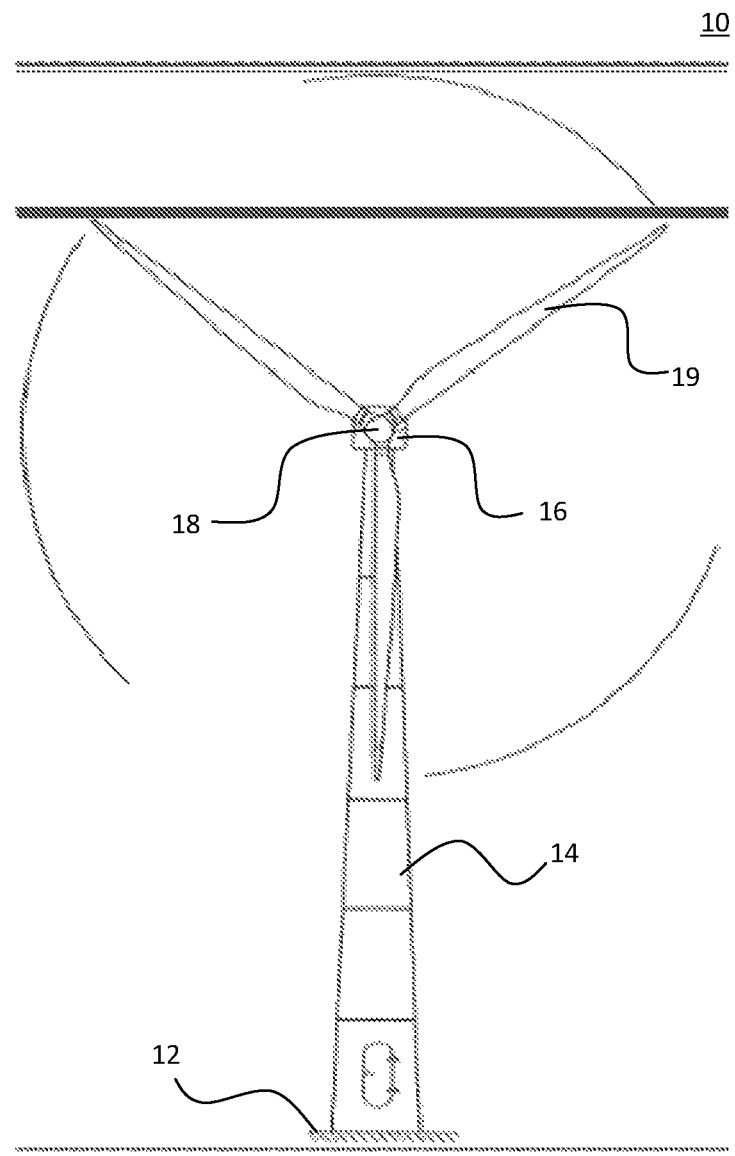
FIG. 1 shows a common setup of a wind turbine.

FIG. 1 shows a common setup of a wind turbine 10 which includes embodiments of wind turbines blades 20 according to the present invention. The wind turbine 10 is mounted on a base 12. The wind turbine 10 includes a tower 14 having a number of tower sections. A wind turbine nacelle 16 is placed on top of the tower 14. A wind turbine rotor, connected to the nacelle 16, includes a hub 18 and at least one rotor blade or wind turbine blade, e.g. three wind turbine blades 20. The wind turbine blades 20 are connected to the hub 18 which in turn is connected to the nacelle 16 through a low speed shaft which extends out of the front of the nacelle 16.

Figure 2:
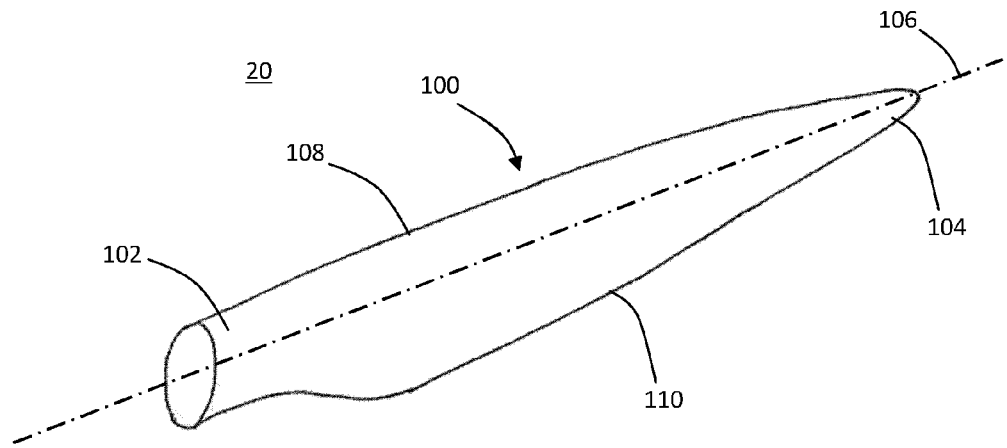
FIG. 2 shows a perspective view of an embodiment of the present invention.

FIG. 2 shows an exemplary embodiment of the present invention. As shown in FIG. 2, the wind turbine blade 20 has an elongated blade body 100 which extends along a longitudinal axis 106. The blade body 100 has a root 102 at one longitudinal end of the blade body 100 and a tip 104 at the other longitudinal end of the blade body 100.

The root 102 being connectable to the hub 18 of the wind turbine 10 (not shown in FIG. 2) and the tip 104 being a free end of the blade body 100. The blade body 100 has an airfoil cross-sectional area (see FIG. 2), perpendicular to the longitudinal axis 106 of the blade body 100 and the cross-sectional area proximate the root 102 may be larger than the cross-sectional area proximate the tip 104 and the cross-sectional area of the blade body 100 at about the blade root 102 reduces along the longitudinal axis 106 to the tip 104. The blade body 100 has a leading edge 108 (edge contacting the wind first) extending substantially from the root 102 to the tip 104 and a trailing edge 110 (edge where the wind leaves the blade) spaced from the leading edge 108 in a span-wise direction of the blade body 100. Both edges extending substantially from the root 102 to the tip 104 opposite and spaced from the leading edge 108 in a span-wise direction of the blade body 100.

Figure 3:
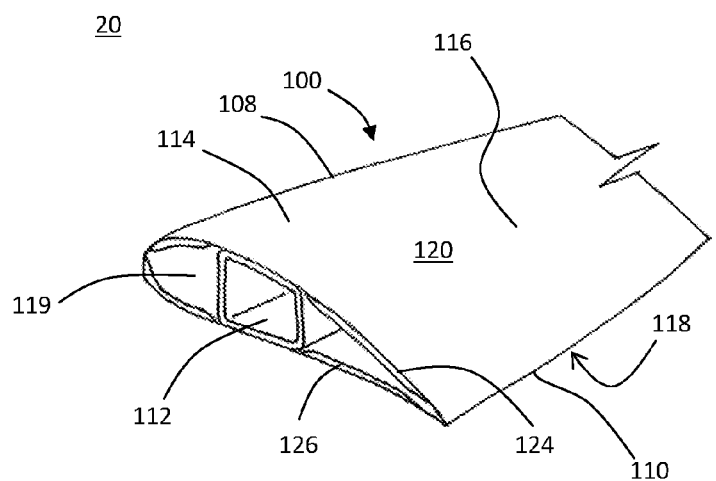
FIG. 3 shows a perspective view of the embodiment in FIG. 2 with a portion of the blade body removed.

As shown in FIG. 3, the blade body 110 may have a spar 112, for example, of a tubular cross-section within the blade body 100 and the spar 112 may extend substantially along the length of the blade body 110 from about the blade root 102 to the blade tip (although only a portion of the length of the spar 112 is shown in FIG. 2) to provide structural strength and integrity to the blade body 110. The shape of the blade body 100 may be formed by a shell 114 which is attached to the spar 112 as shown in FIG. 3. The shell 114 has an airfoil cross-section as shown in FIG. 2. The shell 114 is formed by an upper skin 116 and a lower skin 118 spaced from the upper skin 116 in the thickness direction of the blade body 100 such that the upper skin 116 and the lower skin 118 defines a space 119 therebetween. Both upper and lower skins 116,118 extend from the leading edge 108 to the trailing edge 110 and from the blade root 102 to the blade tip 104. The upper skin 116 forms a suction surface 120 of the airfoil profile of the blade body 100 and the lower skin 118 forms a pressure surface 122 (not shown in FIG. 3) of the airfoil profile of the blade body 100. Accordingly, the suction surface 120 and the pressure surface 122 are spaced apart from each other in the thickness direction.

In FIG. 3, upper and lower skins 116,118 comprise an upper laminated layer 124 and a lower laminated layer 126, both the upper and lower laminated layer 124,126 extend from the blade root 102 towards the blade tip 104 and at least adjacent from or from the leading edge 108 to the trailing edge 110 of the blade body 110. The laminated layers 124,126 may extend from the blade root 102 to the blade tip 104. The laminated layer 124,126 extends from at least adjacent from or from the leading edge 108 towards the trailing edge 110. Alternatively, although not shown in the figures, the laminated layers 124,126 may have a substantially uniform thickness which extends at least adjacent from or from the leading edge 108 to at least adjacent to or to the trailing edge 110. Although it is shown in FIG. 3 that both the upper skin 116 and lower skin 118 comprise of laminated layer, it is possible that only one of the skins 116,118 has laminated layer. As shown in FIG. 3, the laminated layers 124,126 have a substantially uniform thickness between the leading edge 108 and spar 112 and between the trailing edge 110 and spar 112 apart from the portions proximate the leading and trailing edges 108,110 and spar 112 where the laminated layers 124,126 decreases in thickness as they approach the leading and trailing edges 108,110 and spar 112 respectively. Alternatively, the laminated layers 124,126 may be extended to areas of the skins 116,118 where heating of the skin is required.

Figure 4:
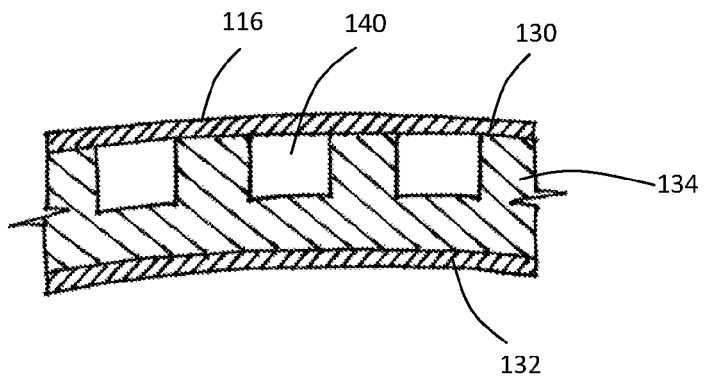
FIG. 4 shows a close-up view of a laminated layer of the embodiment in FIG. 3.

In FIG. 4, a closed-up sectional view of an embodiment of the upper laminated layer 124 is shown. In the following description, the upper laminated layer 124 is used to show the composition of the laminated layers 124,126. However, the description is also applicable to the lower laminated layer 126 accordingly. Upper laminated layer 124 has an outer layer 130, an inner layer 132 spaced from the outer layer 130 in the thickness direction of the blade body 100. The inner layer 132 is spaced in the thickness direction towards the lower laminated layer 126 (see FIG. 3). Outer layer 130 forms the upper skin 116 when the laminated layer 124 extends an area corresponding to the upper skin 116 or part of the upper skin 116 of the blade body 100 when the laminated layer 124 extends an area smaller than the upper skin 116. The inner layer 132 adjacent the space 119 in the blade body 100. An intermediate layer 134 is sandwiched between the outer layer 130 and inner layer 132 and has a plurality of heat transfer paths 140 extending from the blade root 102 towards the blade tip 104 within the intermediate layer 134 for transferring heat from the blade root 102 towards the blade tip 104. The heat transfer paths 140 may extend from the blade root 102 to the blade tip 104. Details of the heat transfer paths 140 will be described in detail later.

Outer and inner layers 130,132 may be made of reinforced plastics or resins e.g. fibreglass material, carbon. The laminated layers 124,126 may provide structural strength to the construction of the blade 20. In the present embodiment, the intermediate layer 134 may be formed by a foam layer 136 or equivalent.

Figure 7:
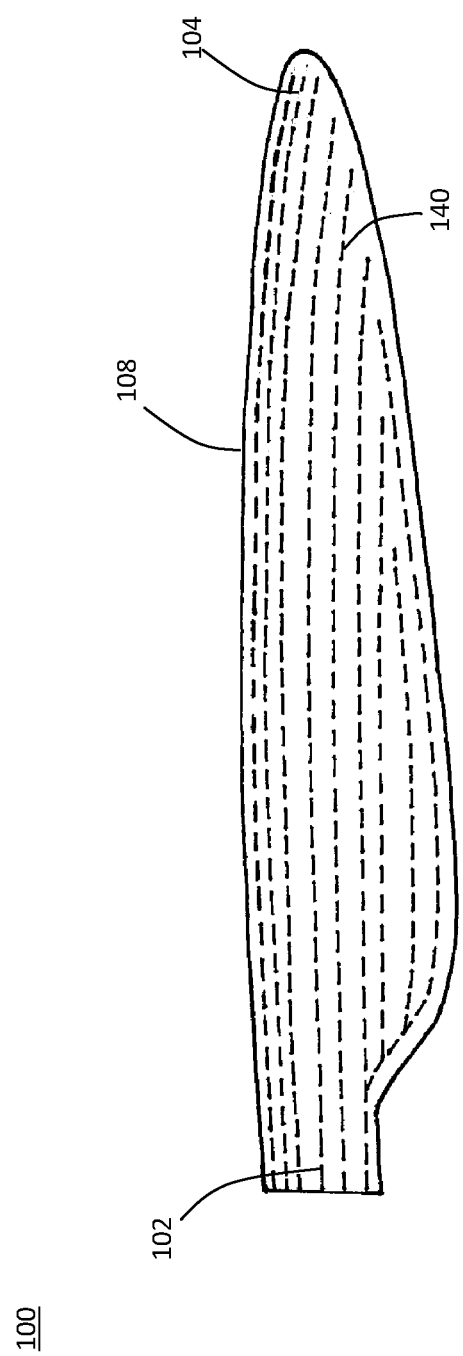
FIG. 7 shows a top view of the embodiment in FIG. 4 or 5 having a varying concentration of heat transfer paths in the span-wise direction of the blade body.

As shown in the embodiment in FIG. 4, the plurality of heat transfer paths 140 are formed in the foam layer 136. In the embodiment of FIG. 4, there may be more than two, three or four of the heat transfer paths 140 in the intermediate layer 134. As shown in FIG. 4, the plurality of heat transfer paths 140 are adjacent the outer layer 130 along a substantial length of the blade body. The heat transfer paths 140 may be open channels having an open side facing the outer layer 130. The heat transfer paths 140 may be closed channels in close proximity to the outer layer 130 without contacting the outer layer so long as heat can be transferred from a fluid, which will be described later, in the channel to the outer layer 130. The heat transfer paths 140 are spaced apart from each other in the span-wise direction of the blade body 100. As shown in FIG. 7, the heat transfer paths 140 may be substantially parallel to each other from the blade root 102 to the blade tip 104 in the intermediate layer 134. The heat transfer paths 140 may be parallel to the leading edge 108 to provide continuous heating along that edge. The spacing between the heat transfer paths 140 may be equal throughout the width in the span-wise direction of the blade body 100 or may vary. The spacing of the heat transfer paths 140 may be the same at a portion of the intermediate layer 134 and vary at another portion of the intermediate layer 134. The spacing may be reduced or increased to increase or lower the concentration or number of heat transfer paths 140 per unit area of skin 116,118. As shown in FIG. 7, the span-wise spacing of the heat transfer paths 140 may be varied according to the heating requirement of the blade body 100. For example, if more heating is required in the proximity of the leading edge 108, the concentration of the heat transfer paths 140 and/or the number of heat transfer paths per unit cross-sectional area running adjacent the leading edge 108 may be higher than the concentration and/or number of heat transfer paths 140 per unit area along the blade body 100 away from the leading edge 108. The spacing may have an effect on the structural strength of the skin 116,118 and the determination of the spacing may depend on the design requirements, e.g. loading on the blade body 100, heating requirement.

A portion of the plurality of heat transfer paths 140 may be interlinked to form a network of heat transfer paths 140 to allow transferring of heat from one path to another when heat is transferred from the blade root 102 towards the blade tip 104. All the heat transfer paths 140 may be interlinked to form a single network of heat transfer paths 140. The heat transfer paths 140 may be linked by crossing of the paths 140 or having linking paths between the paths 140. The benefit of having a network of heat transfer paths 140 is the availability of alternative paths in the network to re-divert the fluid in the event that one path is blocked or choked due to accumulation of dirt etc.

Figure 5:
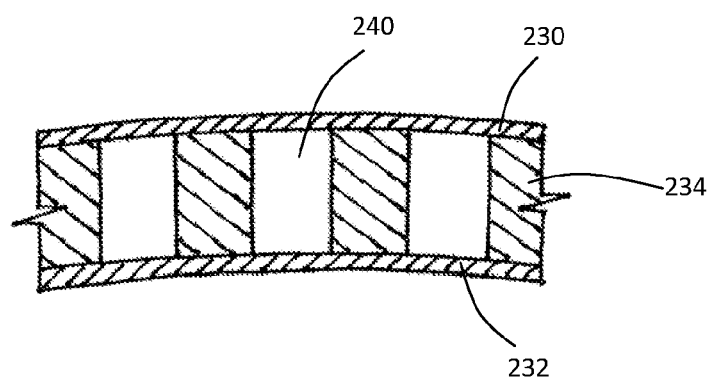
FIG. 5 shows a close-up view of another embodiment of the laminated layer in FIG. 3.

In another embodiment as shown in FIG. 5, the intermediate layer 234 is sandwiched between the outer layer 230 and inner layer 232 as per the earlier embodiment in FIG. 4. Heat transfer path 240 within the intermediate layer 234 has a cross-sectional area which is transverse to the longitudinal axis 106 (not shown in FIG. 5) and extends from the inner layer 232 to the outer layer 230. Similar to the embodiment in FIG. 4, the heat transfer paths 240 may be isolated individually or linked to form a network or a plurality of networks and in either way, the paths 240 extend from the blade root 102 towards or to the blade tip 104 (not shown in FIG. 5).

Although the heat transfer paths 140 shown have substantially parallel vertical walls such that paths are of a square or oblong cross-sectional area, the paths 140 may have other cross-sectional area like quadrilateral, e.g. trapezoidal or V-shaped cross-sectional area.

Figure 6:
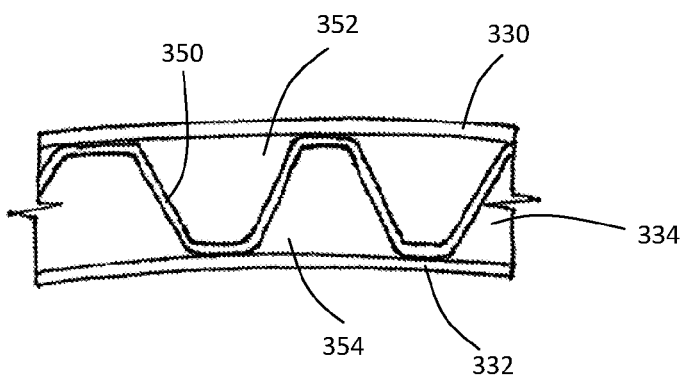
FIG. 6 shows a close-up view of another embodiment of the laminated layer in FIG. 3.

FIG. 6 shows the intermediate layer 334 having a corrugated layer 350 between the outer layer 330 and inner layer 332. The intermediate layer 334 is formed by the corrugated layer 350 with outer channels 352 and inner channels 354 being configured into the corrugated layer 350 such that the outer channels 352 face the outer layer 330 and the inner channels 354 face the inner layer 332. As shown in FIG. 6, the intermediate layer 334 is configured into the corrugated layer wherein the outer channels 352 that are formed between the outer layer 330 and the corrugated layer 350 and the inner channels 354 that are formed between the inner layer 332 and the corrugated layer 350 alternate with each other in the span-wise direction of the blade body 100 to form the corrugated layer 350.

The plurality of heat transfer paths 140 may be channels (as shown in FIGS. 4 and 5) adapted to guide a heat transfer fluid, which may be gas or heated air, therealong such that heat is transferred from the blade root towards the blade tip via the fluid when the fluid upon heated is transmitted from the blade root 102 to the blade tip 104 (not shown in FIG. 4) within the channels. Heat transfer paths 140 may be any solid material that is able to conduct heat, e.g. boron nitride.

The wind turbine 20 may include a heater which the heat transfer paths 140 are connected for generating heat. As mentioned earlier, the heat transfer paths 140 may include heat conductors or channels.

For an embodiment including a heat conductor, the heat generated by the heater is conducted from the heater (via conduction) into the intermediate layer 134 via the conductors to heat up the outer layer 130 so as to de-ice the blade body 100.

For an embodiment of channels, the heat generated by the heater is transferred from the heater to the fluid. For this embodiment of channels, the wind turbine 20 may include a pump in fluid communication with the heat transfer paths 140 for pumping the fluid into the channels. The heater, pump and channels may form a close-circuit heating system wherein the fluid that is heated and pumped into the channels may be re-circulated via a return duct (to be described later) and heated and pumped back again into the channels. The heating system may be an open system wherein the fluid which is heated and pumped into the channels may be exhausted into the environment via an exhaust vent (to be described later). The heating system may include a reservoir of fluid for holding the fluid wherein the reservoir of fluid is connected to and in fluid communication with the channels. The heating system may also include the pump in fluid communication with the reservoir of fluid and the channels for pumping the fluid from the reservoir into the channels. The reservoir of fluid may be heated up by the heater and the heated fluid may be pumped from the reservoir into the channels and through the intermediate layer 134 via the channels to heat up the outer layer 130 (via heat convection) so as to de-ice the blade body 100. The heater may include heating elements and/or a heat exchanger for heating the fluid. The heating elements or heat exchanger may be located between the pump and channels or in the channels so that fluid may be pumped along or through the heating element or through the heat exchanger to be heated up before or after entering the channels. The heating elements or heat exchanger may be located in the reservoir of fluid to heat up the fluid before being pumped into the channels. The heater, pump and reservoir of fluid may be located in the hub 18 or nacelle 16, in any case, out of the wind turbine blades 20, where they do not interfere in the rotation of the blades 20.

The plurality of heat transfer paths 140 may be divided into sections of paths. For example, the blade body 100 may be divided into a leading edge section, mid-section and trailing edge section. The leading edge section is the area of the blade body that is adjacent the leading edge 108, the trailing edge section is the area of the blade body 100 that is adjacent the trailing edge 110 and the mid-section is the area of the blade body 100 that is between the leading edge section and the trailing edge section. Heat may be transferred according to the section, e.g. leading edge section, if only heating is required at the leading edge. In this way, it is possible to isolate the transfer of heat by the section. Within each section, the heat transfer paths 140 may be interlinked to for a network of paths 140. As such, a more effective and energy saving way of de-icing the blade 20 is achieved. Optionally, heat may be directed to selected heat transfer paths 140.

Additionally, the blade body 100 may include a return fluid duct (not shown in figures) as mentioned earlier within the intermediate layer 134,234,334 and in fluid communication with the heat transfer paths 140,240,340 for directing the fluid back towards the blade root 102 so that the fluid can be re-circulated into the heat transfer paths 140,240,340. The return fluid duct, as understood by a skilled person, may be incorporated into any one of the above embodiments shown and may be incorporated within the intermediate layer 134 or the space 119 between the skins 116,118.

Additionally, the blade body 100 may include an air vent (not shown in the figures) on the inner layer 132,232,332 of the laminate layers 124,126, the air vent being in fluid communication with the heat transfer paths 140,240,340 for releasing the fluid into the space 119 within the blade body 100. The air vent may be incorporated into any one of the embodiments mentioned above. The air vent may be implemented together with the return fluid duct into a single embodiment.

Additionally, the blade body 100 may include an exhaust vent as mentioned earlier (not shown in the figures) on the outer layer 130,230,330 of the laminate layer 124,126, the exhaust vent being in fluid communication with the heat transfer paths 140,240 for releasing the fluid into the environment. The exhaust vent may be incorporated into any one of the embodiments mentioned above. The exhaust vent may be implemented together with the return fluid duct and/or air vent into any of the embodiments described above.

Although various types of fluid may be used to transfer heat to the blade body, air is used for the embodiments described. The weight contribution of air to the blades 20 is negligible and does not affect the loading on the blades substantially. Comparatively, the weight contribution of liquid to the blades 20 may be substantial. The weight of the fluid may be more significant during the rotation of the blades 20 due to centrifugal forces. Further, the design requirement for housing and channeling of air is less demanding than that for liquid. In addition, in the event of a leakage of the fluid, the leakage of air into the environment is negligible as compare to the leakage of liquid.

Although not shown in the figures, it is possible that the laminated layers 124,126 have more layers than the three layers mentioned, i.e. outer, intermediate and inner layers 130,132,134.

The material used for the laminated layers 124,126 may be a non-electrical conductor and yet provide structural strength to the blades. Electrical conducting material used in the wind turbine 10 would pose the wind turbine 10 as a lightning hazard during a thunderstorm. The intermediate layer 434 may be made of a heat conducting material and yet does not conduct electricity so that intermediate layer 434 can effectively conduct thermal energy without being a lightning hazard.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A wind turbine blade , comprising:
   an elongated blade body extending along a longitudinal axis and having a blade root at one longitudinal end of the blade body and a blade tip at another longitudinal end of the blade body;
   a leading edge and a trailing edge, both extending from the blade root to the blade tip, the trailing edge spaced from the leading edge in a span-wise direction of the blade body;
   an upper skin and a lower skin extending from the leading edge to the trailing edge and from the blade root to the blade tip, the lower skin spaced from the upper skin in a thickness direction of the blade body, the upper skin and the lower skin defining a space therebetween, wherein at least one of the upper skin or the lower skin comprises:
   a laminated layer extending from the blade root towards the blade tip and at least adjacent from or from the leading edge towards the trailing edge, the laminated layer comprising:
      an outer layer wherein the outer layer forms part of the upper and/or lower skin respectively;
      an inner layer spaced from the outer layer in the thickness direction; and
      an intermediate layer sandwiched between the outer layer and inner layer, the intermediate layer comprising a plurality of heat transfer paths extending from the blade root towards the blade tip within the intermediate layer for transferring heat from the blade root towards the blade tip, wherein the intermediate layer comprises a foam layer, and wherein the plurality of heat transfer paths are formed in the foam layer.

2. The blade according to claim 1, wherein the plurality of heat transfer paths in the intermediate layer includes one of two, three, and four heat transfer paths.

3. The blade according to claim 1, wherein the laminated layer extends from the blade root to the blade tip, and wherein the plurality of heat transfer paths extend from the blade root to the blade tip.

4. The blade according to claim 1, wherein the plurality of heat transfer paths are adjacent the outer layer along a substantial length of the blade body.

5. The blade according to claim 1, wherein one or more or each of the heat transfer paths has a cross-sectional area which is transverse to the longitudinal axis and extends from the inner layer to the outer layer.

6. The blade according to claim 1, wherein a portion of the plurality of heat transfer paths are interlinked to form a network of heat transfer paths to allow transferring of heat from one path to another when heat is transferred from the blade root towards the blade tip.

7. The blade according to claim 1, wherein a concentration of heat transfer paths or the number of heat transfer paths per unit area running adjacent the leading edge is higher than a concentration of heat transfer paths or the number of heat transfer paths per unit area along the blade body away from the leading edge.

8. The blade according to claim 1, wherein the one or more or each of heat transfer paths are formed by channels adapted to guide a fluid there-along, whereby the heat can be transferred via the fluid.

9. The blade according to claim 8, further comprising a return fluid duct within the intermediate layer and in fluid communication with the channels for directing the fluid back towards the blade root so that the fluid can be re-circulated into the channels.

10. The blade according to claim 8, wherein the fluid is air.

11. The blade according to claim 10, further comprising an air vent in the inner layer of the laminate layer, the air vent being in fluid communication with the channels for releasing the air into the space within the blade body.

12. The blade according to claim 8, further comprising an exhaust air vent on the outer layer of the laminate layer, the exhaust air vent being in fluid communication with the channels for releasing the air into the environment.

13. The blade according to claim 1, wherein the intermediate layer is formed as a corrugated layer with outer and inner channels being configured into the corrugated layer wherein the outer channels face the outer layer and the inner channels face the inner layer.

14. A wind turbine blade, comprising:
an elongated blade body extending along a longitudinal axis and having a blade root at one longitudinal end of the blade body and a blade tip at another longitudinal end of the blade body;
a leading edge and a trailing edge, both extending from the blade root to the blade tip, the trailing edge spaced from the leading edge in a span-wise direction of the blade body;
an upper skin and a lower skin extending from the leading edge to the trailing edge and from the blade root to the blade tip, the lower skin spaced from the upper skin in a thickness direction of the blade body, the upper skin and the lower skin defining a space therebetween, wherein at least one of the upper skin or the lower skin comprises:
a laminated layer extending from the blade root towards the blade tip and at least adjacent from or from the leading edge towards the trailing edge, the laminated layer comprising:
an outer layer wherein the outer layer forms part of the upper and/or lower skin respectively;
an inner layer spaced from the outer layer in the thickness direction; and
an intermediate layer sandwiched between the outer layer and inner layer, the intermediate layer comprising a plurality of heat transfer paths extending from the blade root towards the blade tip within the intermediate layer for transferring heat from the blade root towards the blade tip, wherein the one or more or each of heat transfer paths are formed by channels adapted to guide a fluid there-along, whereby the heat can be transferred via the fluid, and wherein the intermediate layer further comprises a return fluid duct within the intermediate layer and in fluid communication with the channels for directing the fluid back towards the blade root so that the fluid can be re-circulated into the channels.

15. The wind turbine blade of claim 14, wherein the fluid is air.

16. The wind turbine blade of claim 15, further comprising an air vent in the inner layer of the laminate layer, the air vent being in fluid communication with the channels for releasing the air into the space within the blade body.

17. The wind turbine blade of claim 14, further comprising an exhaust air vent on the outer layer of the laminate layer, the exhaust air vent being in fluid communication with the channels for releasing the air into the environment.

18. The wind turbine of claim 14, wherein a portion of the plurality of heat transfer paths are interlinked to form a network of heat transfer paths to allow transferring of heat from one path to another when heat is transferred from the blade root towards the blade tip.

19. The wind turbine of claim 14, wherein a concentration of heat transfer paths or the number of heat transfer paths per unit area running adjacent the leading edge is higher than a concentration of heat transfer paths or the number of heat transfer paths per unit area along the blade body away from the leading edge.

20. The wind turbine of claim 14, wherein the laminated layer extends from the blade root to the blade tip, and wherein the plurality of heat transfer paths extend from the blade root to the blade tip.

* * * * *